United States Patent
Surace

(10) Patent No.: US 12,510,019 B1
(45) Date of Patent: Dec. 30, 2025

(54) REPAIR OF CERAMIC VANE USING OVER-WRAP FIBER PLY AND RE-STAGGER

(71) Applicant: RTX CORPORATION, Farmington, CT (US)

(72) Inventor: Raymond Surace, Newington, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 19/038,026

(22) Filed: Jan. 27, 2025

(51) Int. Cl.
| | |
|---|---|
| *F02C 3/04* | (2006.01) |
| *F01D 5/00* | (2006.01) |
| *F01D 5/28* | (2006.01) |
| *F02C 7/00* | (2006.01) |

(52) U.S. Cl.
CPC .............. *F02C 3/04* (2013.01); *F01D 5/005* (2013.01); *F01D 5/282* (2013.01); *F02C 7/00* (2013.01); *F05D 2230/80* (2013.01); *F05D 2300/6033* (2013.01)

(58) Field of Classification Search
CPC ......... F05D 2230/80; F05D 2300/6033; F01D 5/005; F01D 5/282; F02C 3/04; F02C 7/00
See application file for complete search history.

(56) References Cited

U.S. PATENT DOCUMENTS

| | | |
|---|---|---|
| 7,500,833 B2 | 3/2009 | Bublath et al. |
| 11,890,836 B2 | 2/2024 | Hockemeyer et al. |
| 2019/0284104 A1* | 9/2019 | Tanigawa ............ C04B 41/0081 |
| 2019/0284942 A1* | 9/2019 | Tanigawa ................ C23C 4/02 |

* cited by examiner

*Primary Examiner* — Moshe Wilensky
(74) *Attorney, Agent, or Firm* — Carlson, Gaskey & Olds, P.C.

(57) ABSTRACT

A method of repairing a ceramic vane includes providing a ceramic vane that includes a platform and an airfoil section that extends from the platform. The platform includes a mounting surface for supporting the ceramic vane and the airfoil section includes a damaged region. An over-wrap fiber ply is wrapped around the airfoil section and covers the damaged region. The over-wrap fiber ply is then densified with a ceramic matrix material to form a ceramic matrix composite over-wrap repair layer. A build-up layer is applied to the at least one mounting surface. A desired stagger angle is provided to the ceramic vane by adjusting a thickness and contour of the at least one build-up layer.

10 Claims, 3 Drawing Sheets

REPAIR OF CERAMIC VANE USING OVER-WRAP FIBER PLY AND RE-STAGGER

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A method of repairing a ceramic vane of a gas turbine engine according to an example of the present disclosure includes providing a ceramic vane that has at least one platform and an airfoil section that extends from the at least one platform, the airfoil section includes a damaged region, wrapping at least one over-wrap fiber ply around the airfoil section, the at least one over-wrap fiber ply covering the damaged region, densifying the at least one over-wrap fiber ply with a ceramic matrix material to thereby form a ceramic matrix composite over-wrap repair layer, applying at least one build-up layer to the at least one mounting surface of the platform, and providing a desired stagger angle to the ceramic vane by adjusting a thickness and contour of the at least one build-up layer.

In a further embodiment of any of the foregoing embodiments, the damaged region includes at least one of spall, cracking, erosion, or recession.

In a further embodiment of any of the foregoing embodiments, the at least one mounting surface is on the at least one platform.

In a further embodiment of any of the foregoing embodiments, the at least one over-wrap fiber ply includes a ceramic fiber ply.

In a further embodiment of any of the foregoing embodiments, the ceramic vane is a ceramic matrix composite.

In a further embodiment of any of the foregoing embodiments, the build-up layer is at least one fiber ply.

In a further embodiment of any of the foregoing embodiments, the build-up layer is a coating.

In a further embodiment of any of the foregoing embodiments, the at least one mounting surface is a substantially axially-facing surface.

In a further embodiment of any of the foregoing embodiments, the at least one over-wrap fiber ply, once wrapped, includes a downstream-facing seam in which the at least one over-wrap fiber ply overlaps itself.

A further embodiment of any of the foregoing embodiments further includes, the prior to the wrapping, removing a barrier coating from the ceramic vane and, after the densifying, applying a new barrier coating on at least the ceramic matrix composite over-wrap repair layer.

A repaired ceramic vane of a gas turbine engine according to an example of the present disclosure includes at least one platform and an airfoil section that extends from the at least one platform. The at least one platform includes at least one mounting surface for supporting the ceramic vane and the airfoil section including a damaged region, At least one over-wrap fiber ply is wrapped around the airfoil section. The at least one over-wrap fiber ply covers the damaged region. The at least one over-wrap fiber ply is densified with a ceramic matrix material. There is at least one build-up layer on the at least one mounting surface. The at least one build-up layer has an adjusted thickness and contour that provide a desired stagger angle to the ceramic vane.

In a further embodiment of any of the foregoing embodiments, the damaged region includes at least one of spall, cracking, erosion, or recession.

In a further embodiment of any of the foregoing embodiments, the at least one mounting surface is on the at least one platform.

In a further embodiment of any of the foregoing embodiments, the at least one over-wrap fiber ply includes a ceramic fiber ply and the ceramic vane is a ceramic matrix composite.

In a further embodiment of any of the foregoing embodiments, the build-up layer is at least one fiber ply.

In a further embodiment of any of the foregoing embodiments, the build-up layer is a coating.

In a further embodiment of any of the foregoing embodiments, the at least one mounting surface is a substantially axially-facing surface.

In a further embodiment of any of the foregoing embodiments, the at least one over-wrap fiber ply includes a downstream-facing seam in which the at least one over-wrap fiber ply overlaps itself.

A gas turbine engine according to an example of the present disclosure includes a compressor section, a combustor in fluid communication with the compressor section, and a turbine section in fluid communication with the combustor. The turbine section has ceramic vanes according to any of the foregoing embodiments disposed about a central axis of the gas turbine engine.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. In this disclosure, like reference numerals designate like elements where appropriate and reference numerals with the addition of one-hundred or multiples thereof designate modified elements that are understood to incorporate the same features and benefits of the corresponding elements. The drawings that accompany the detailed description can be briefly described as follows.

DETAILED DESCRIPTION

Figure 1:
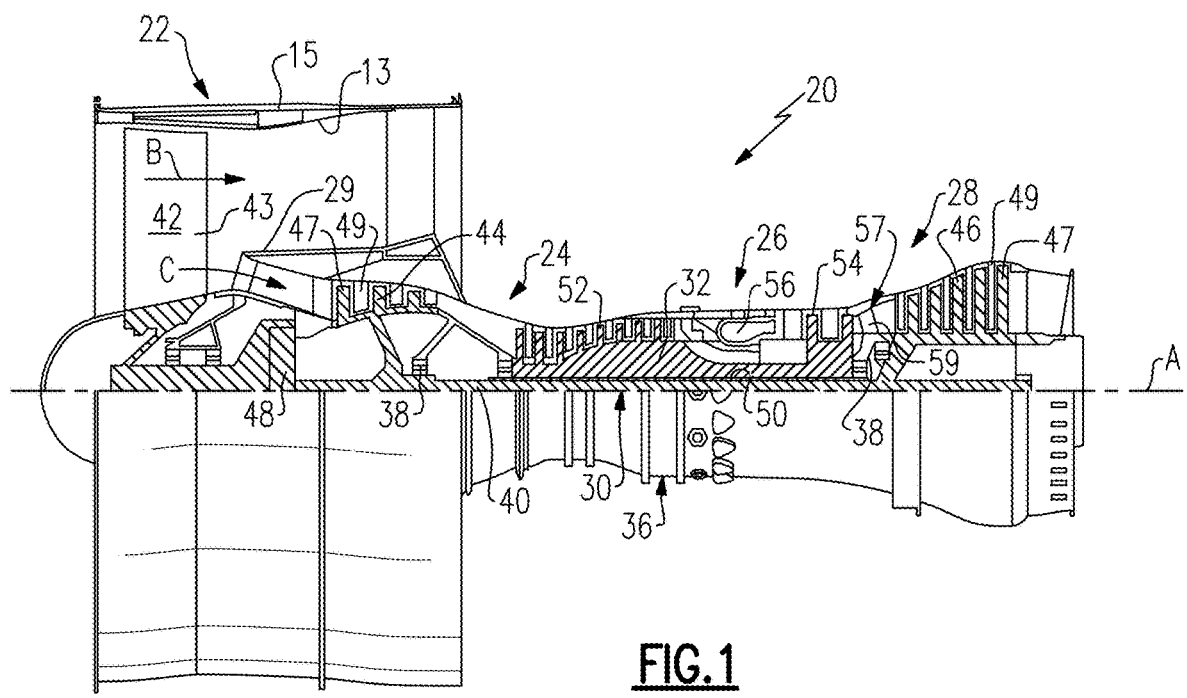
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axis.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7°R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2A:
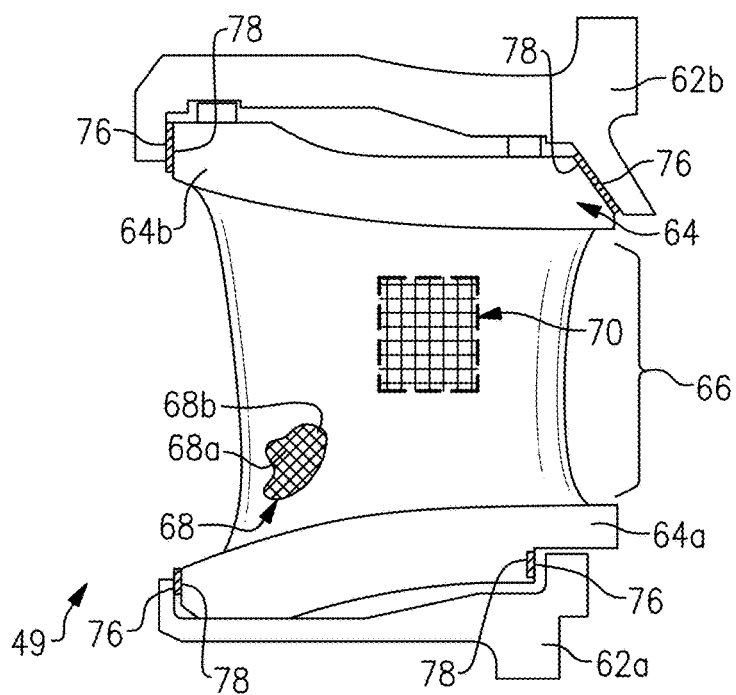
FIG. 2A illustrates a ceramic vane after a period of use in the engine.
Figure 2B:
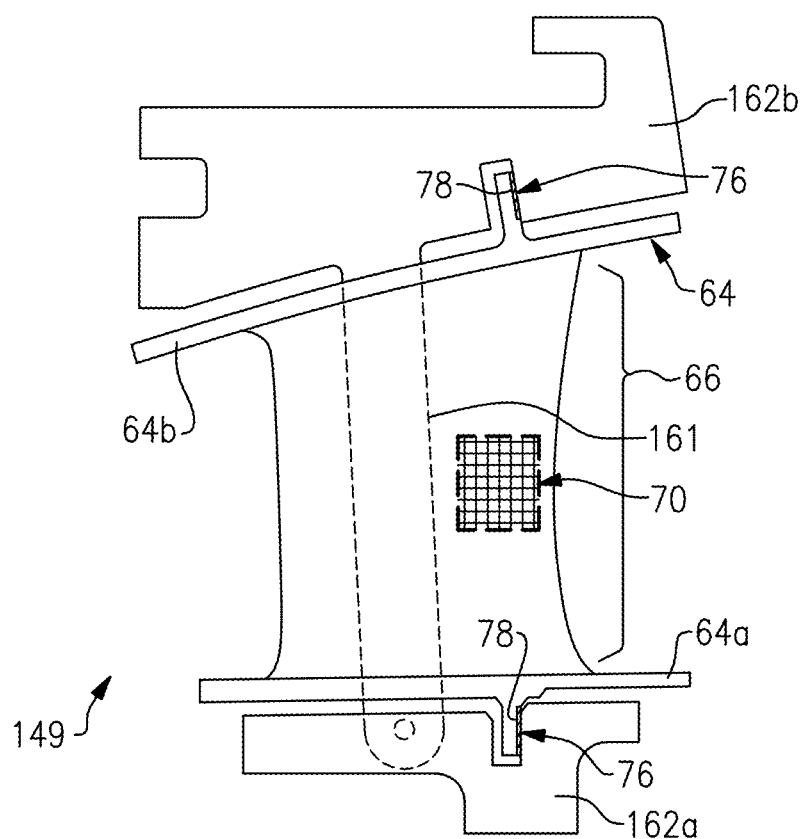
FIG. 2B illustrates another example of a ceramic vane after a period of use in the engine.
Figure 5:
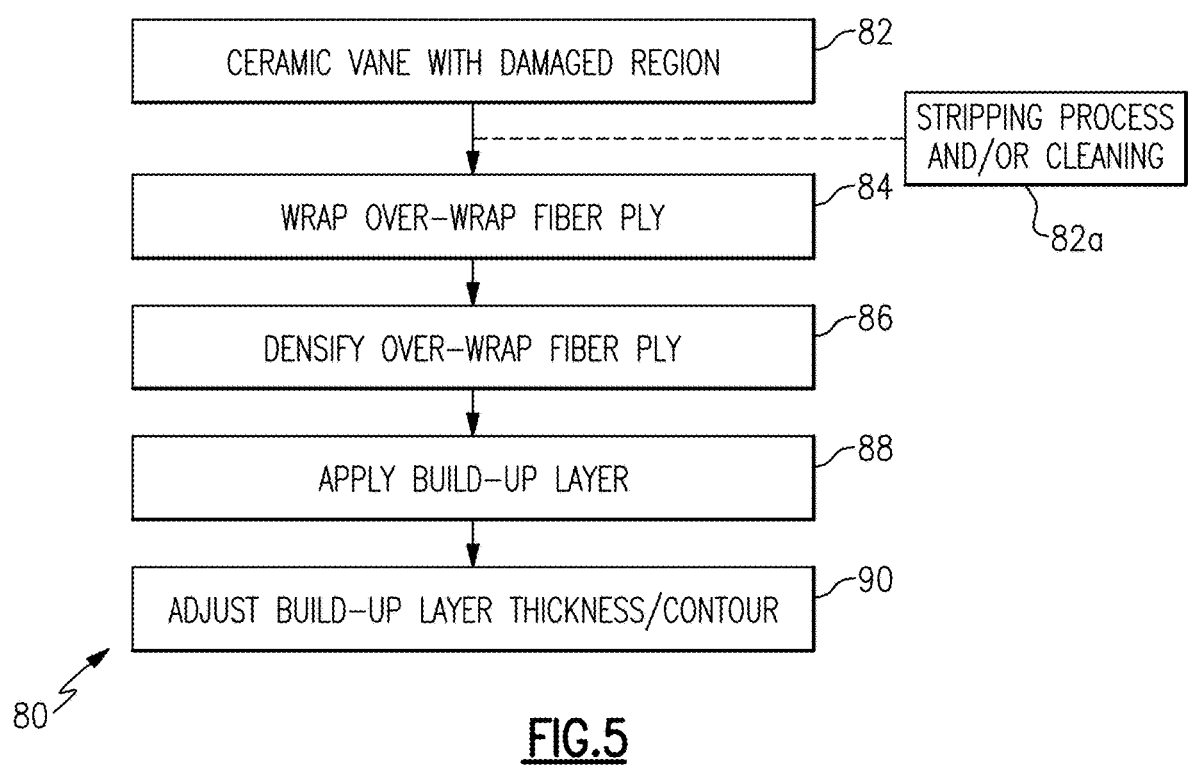
FIG. 5 depicts a method of repair.

FIG. 2A illustrates a representative example of a ceramic vane 49, such as from the turbine section 28 or one of the airfoils 47, which will serve as a basis for examples of a method of repair 80 depicted in FIG. 5. In this example, the vane 49 is of a "ring-strut-ring" configuration in which the vane 49 is supported between inner and outer rings 62a/62b, such as engine cases or annular support hardware. Alternatively, the ceramic vane 149 illustrated in FIG. 2B may serve as the basis of the method of repair 80. The vane 149 is of a "spar and faring" configuration in which the vane 149 is an airfoil faring that is supported by a spar 161 between inner and outer supports 162a/162b. It will also be appreciated that the examples herein are not limited to the ring-strut-ring or the spar and faring configurations.

Referring again to the vane 49 in FIG. 2A, the vane 49 includes at least one platform 64 and an airfoil section 66 extending from the at least one platform 64. In the example, there is a radially inner platform 64a and a radially outer platform 64b. The vane 49, including the platforms 64a/64b and airfoil section 66, are formed of a ceramic matrix composite (CMC) 68, which is shown in a cutaway view in FIG. 2A. The CMC 68 is comprised of ceramic fiber plies 68a in a ceramic matrix 68b. Example ceramic matrices are silicon-containing ceramics, such as but not limited to, a silicon carbide (SiC) matrix or a silicon nitride (Si3N4) matrix. Ceramic fibers are formed of bundles of filaments and may include, but are not limited to, silicon carbide (SiC) fibers or silicon nitride (Si3N4) fibers. The CMC 68 may be, but is not limited to, a SiC/SiC CMC in which SiC fiber plies are disposed within a SiC matrix.

The vane 49 is depicted after a period of use in the engine 20, and from said use may exhibit a damaged portion 70. The damaged portion 70 in this example is located mid-span on a suction side of the airfoil section 66, though it is to be understood that the damaged region 70 could be located elsewhere on the airfoil section 66, such as on a pressure side or near filets at the platforms 64a/64b. A "damaged region" is a region of the vane 49 that exhibits blemishes in the material, usually from one or more conditions during use in the engine 20, as compared to the material as originally fabricated, prior to any use in the engine 20. As examples, the damaged region 70 includes at least one of spalling, cracking, erosion, or recession. Spalling refers to a loosening or detachment of a barrier coating or CMC. Cracking refers to a breakage and splitting in a barrier coating and/or in the CMC underlying the coating. Erosion refers to a loss of material from a barrier coating and/or CMC due to impact from particles in the hot gas flow, and recession refers to a loss of material due to high velocity, high pressure vapor in the hot gas flow that reacts with silicon-containing ceramics, such as silicon carbide, to form volatile species.

Such damage may be detected via borescope inspection or engine tear-down. The damage may render a vane unserviceable. However, if a damaged vane can be repaired, the service life can be extended.

An examination and evaluation of the damaged region 70 may be conducted in order to determine severity and thus whether the vane 49 is a candidate for repair. The examination may include, but is not limited to, visual inspection with or without magnification, acoustic inspection, structured light inspection, thermal imaging or CT scan inspection. For example, damage that extends entirely through the thickness of the wall of the vane 49 may be considered unrepairable, while damage that is limited to the surface of the vane 49 or that does not extend entirely through the wall thickness may be considered serviceable and thus repairable.

Upon identification of a vane 49 that is repairable, the vane 49 is provided for a repair process (method step 82). The process may include preparing the vane 49 for the repair. For instance, if the vane includes a barrier coating, the coating is removed in a stripping process at step 82a. The stripping process may be a chemical stripping, a mechanical stripping, or a combination of chemical and mechanical. The surfaces of the vane 49 after the coating removal may then be cleaned to remove any debris, to remove remaining chemicals used in the removal process, and/or to treat the vane surfaces for bonding with subsequent repair material. If the vane 49 does not have a coating, the vane 49 may be cleaned without the coating removal process, or if the surfaces of the vane 49 are already clean, the cleaning process may be omitted.

Figure 3:
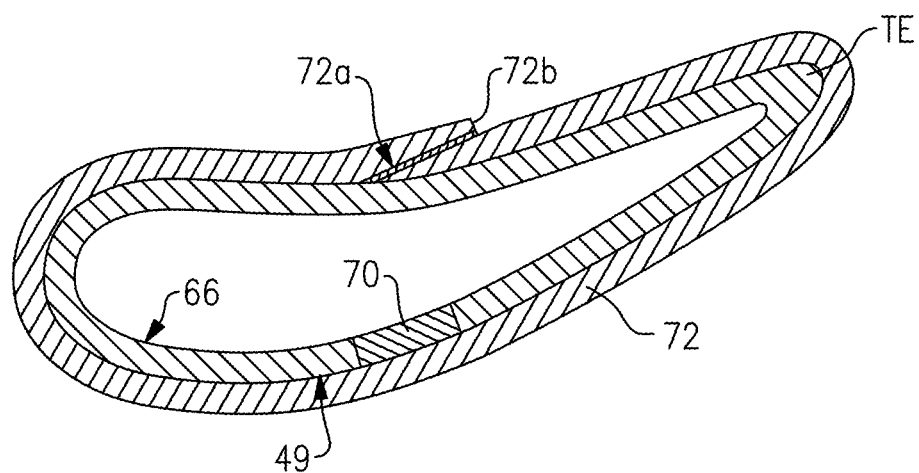
FIG. 3 illustrates a sectioned view of a ceramic vane during a repair process.
Figure 4:
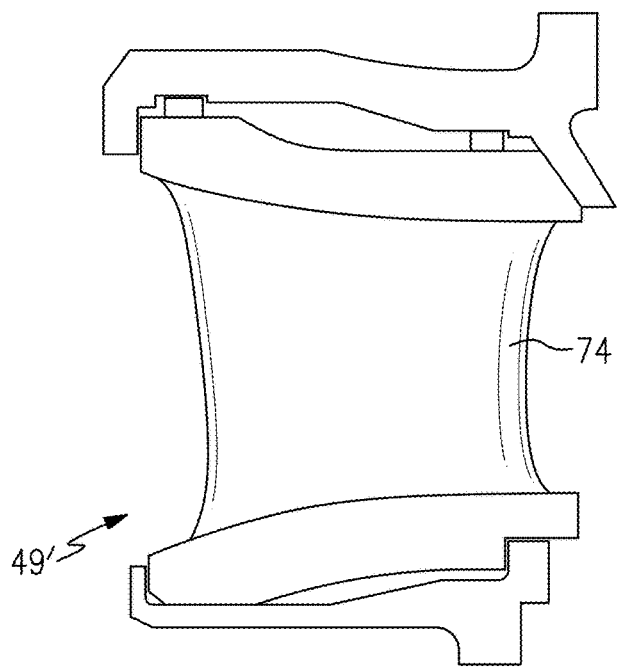
FIG. 4 illustrates a ceramic vane after repair.

Next, as illustrated in the sectioned view through the airfoil section 66 in FIG. 3, at least one over-wrap fiber ply 72 is wrapped around the airfoil section 66 (method step 84). The wrapping may be conducted manually or by automation. For instance, the over-wrap fiber ply 72 is a ceramic fabric that is wrapped around the airfoil section 66 so as to substantially conform to the shape and contour of the airfoil section 66. As an example, the over-wrap fiber ply 72 is cut to a size that covers the full radial span of the airfoil section 66 from platform 64a to platform 64b and that wraps more than one complete revolution around the airfoil section 66. Covering and wrapping substantially all of the airfoil section 66 with the over-wrap fiber ply 72 provides strength to the repaired vane 49' (FIG. 4). In further examples, the over-wrap fiber ply 72 is wrapped multiple revolutions around the airfoil section 66 in order to provide a multi-layered repair that has additional strength. In that case, the over-wrap fiber ply 72 may be a single continuous fabric play that is wrapped, or multiple plies that are wrapped one over another.

As shown, the (outermost) over-wrap fiber ply 72 overlaps itself (or another over-wrap fiber ply, if used) at a downstream-facing seam 72a. That is, the overlapping results in a step 72b, and the step 72b faces toward the trailing edge (TE) of the vane 49, which is the direction (downstream) toward which hot gas flows. Such an orientation of the step 72b facilitates maintaining an aerodynamic surface. To further facilitate aerodynamic performance, the seam 72a may be preferentially placed at a location that has minimal effect on aerodynamic performance. For instance, the seam 72a is located on the pressure side of the airfoil section 66. The seam 72a also does not cross over the location of the damaged region 70, to avoid the potential for ingress of gases through the seam to the damaged region 70. Insofar as there are other layers of the over-wrap fiber ply 72 that have seams 72a, the seams 72a may be offset from one another in order to avoid undue increase in thickness.

The over-wrap fiber ply 72 covers the damaged region 70. For instance, the over-wrap fiber ply 72 lies directly over the surface that contains the damaged region 70. Thus, the damaged region 70 is not removed for the repair, but rather remains in the vane 49 and is covered over with the over-wrap fiber ply 72.

After wrapping the over-wrap fiber ply 72 on the airfoil section 66, the over-wrap fiber ply 72 is then densified with a ceramic matrix material to thereby form a ceramic matrix composite over-wrap repair layer 74 (method step 86), which is shown in the repaired vane 49' in FIG. 4. The process for densification is not particularly limited and may include one or more of pre-impregnation of the over-wrap fiber ply 72 with matrix precursor followed by thermal treatment, chemical vapor infiltration, melt infiltration and polymer infiltration and pyrolysis. If a barrier coating is required, the vane 49 is further subjected to a coating process to provide the barrier coating. The CMC over-wrap repair layer 74 reinforces the airfoil section 66 and seals the damaged region 70 from further direct exposure to the hot gas flow and oxygen ingress.

After densification (and barrier coating, if used), the walls of the vane 49' are thicker than the thickness of the walls of the original vane 49, prior to repair. As a result, the throat area (the flow area between the trailing edge of the vane 49 and the adjacent vane in the engine 20) will be different than the original throat area prior to the repair. The throat area and corresponding flow are designed in consideration of flow in the compressor section 24, the mismatch of which may reduce operating margins or even cause stall. Therefore, the repair process also includes a "re-stagger" to account for the increased wall thickness in the repaired vane 49'. Vane stagger refers to the angle at which a vane (usually the chord) is positioned relative to a reference, such as the engine axis A or incoming flow. Prior to the repair, the vanes 49 are staggered to provide a throat area that corresponds to a desired flow performance. In order to re-establish a desired throat area and desired flow performance, the stagger angle of the repaired vanes 49' is adjusted to account for the increased wall thickness (including the barrier coating, if used). The desired stagger angle may be determined using known analysis techniques. In one example, the flow area is determined based on the thickness of the wall of the repaired airfoil 49' and a baseline stagger angle. The baseline stagger angle can then be adjusted in a flow analysis to a target stagger angle that corresponds to the desired flow performance. The stagger angle of the vane 49' is then adjusted to achieve the target stagger angle.

The adjustment includes applying at least one build-up layer 76 (FIG. 2A) to at least one mounting surface 78 of the vane 49' (method step 88). The mounting surface or surfaces 78 are surfaces on the vane 49' at which the vane 49' is contacted and mechanically supported, e.g., by the rings 62a/62b. In the illustrated example, the mounting surfaces 78 are substantially axially-facing and may be flat or curved, such as conical. For example, the build-up layer 76 is a layer of ceramic fabric that is densified with a matrix material, or a coating that is applied onto the surface 78. Example coatings include, but are not limited to, an elemental silicon coating, a mullite coating, or a silicon carbide (SiC) coating. Such coatings provide good hardness and wear-resistance, yet are readily machinable with common machining techniques. In either case (CMC or coating), the build-up layer 76 is initially oversized and is then machined to a size and contour that achieves the target stagger angle (method step 90). Size refers to the thickness of the build-up layer 76, while contour refers to the curvature and/or angle of the surface of the build-up layer 76. Lastly, the repaired and re-staggered vane 49' is re-installed into the engine 20.

The repair process is depicted as method 80 in FIG. 5, which is understood to incorporate the description of the process above. At step 82 the vane 49 with the damaged region 70 is provided. For example, this may include identifying the vane 49 for repair or simply furnishing the damaged vane 49 to begin the repair process. At step 84, the over-wrap fiber ply 72 is wrapped around the airfoil section 66. At 82a the vane 49 may be cleaned and subjected to coating removal, as described earlier above. At step 86, the over-wrap fiber ply 72 is densified, and at step 88 the build-up layer or layers 76 are applied, followed by adjusting of the build-up layer or layers 76 at step 90 to provide the desired stagger angle.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method of repairing a ceramic vane of a gas turbine engine, the method comprising:
    providing a ceramic vane that includes at least one platform and an airfoil section that extends from the at least one platform, the at least one platform includes at least one mounting surface for supporting the ceramic vane and the airfoil section includes a damaged region;
    wrapping at least one over-wrap fiber ply around the airfoil section, the at least one over-wrap fiber ply covering the damaged region;
    densifying the at least one over-wrap fiber ply with a ceramic matrix material to thereby form a ceramic matrix composite over-wrap repair layer;
    applying at least one build-up layer to the at least one mounting surface; and
    providing a desired stagger angle to the ceramic vane by adjusting a thickness and contour of the at least one build-up layer.

2. The method as recited in claim 1, wherein the damaged region includes at least one of spall, cracking, erosion, or recession.

3. The method as recited in claim 1, wherein the at least one mounting surface is on the at least one platform.

4. The method as recited in claim 1, wherein the at least one over-wrap fiber ply includes a ceramic fiber ply.

5. The method as recited in claim 1, wherein the ceramic vane is a ceramic matrix composite.

6. The method as recited in claim 1, wherein the build-up layer is at least one fiber ply.

7. The method as recited in claim 1, wherein the build-up layer is a coating.

8. The method as recited in claim 1, wherein the at least one mounting surface is a substantially axially-facing surface.

9. The method as recited in claim 1, wherein the at least one over-wrap fiber ply, once wrapped, includes a downstream-facing seam in which the at least one over-wrap fiber ply overlaps itself.

10. The method as recited in claim 1, further comprising, prior to the wrapping, removing a barrier coating from the ceramic vane and, after the densifying, applying a new barrier coating on at least the ceramic matrix composite over-wrap repair layer.

\* \* \* \* \*